US010119587B2

(12) United States Patent
Watanabe

(10) Patent No.: US 10,119,587 B2
(45) Date of Patent: Nov. 6, 2018

(54) SHOCK ABSORBING DEVICE

(71) Applicant: WEL RESEARCH CO., LTD., Ichihara-shi, Chiba (JP)

(72) Inventor: Kazuki Watanabe, Ichihara (JP)

(73) Assignee: WEL RESEARCH CO., LTD., Ichihara-shi (JP)

( * ) Notice: Subject to any disclaimer, the term of this patent is extended or adjusted under 35 U.S.C. 154(b) by 0 days.

(21) Appl. No.: 15/413,148

(22) Filed: Jan. 23, 2017

(65) Prior Publication Data

US 2017/0152906 A1    Jun. 1, 2017

Related U.S. Application Data

(63) Continuation of application No. PCT/JP2014/069286, filed on Jul. 22, 2014.

(51) Int. Cl.
*F16F 1/02* (2006.01)
*B64G 1/22* (2006.01)

(52) U.S. Cl.
CPC .............. *F16F 1/021* (2013.01); *B64G 1/22* (2013.01); *F16F 2224/0208* (2013.01); *F16F 2224/0258* (2013.01)

(58) Field of Classification Search
CPC ............... F16F 1/021; F16F 2224/0208; F16F 2224/0258; F16F 1/3732; F16F 1/3735; F16F 1/38; B64G 1/22

(Continued)

(56) References Cited

U.S. PATENT DOCUMENTS 4,401,290 A * 8/1983 Butler .................... A47C 7/002
                                                                 248/560
4,713,714 A * 12/1987 Gatti ....................... G11B 33/08
                                                                 248/581

(Continued)

FOREIGN PATENT DOCUMENTS

JP     S47-45988 B1    11/1972
JP     H09-89045 A      3/1997

(Continued)

OTHER PUBLICATIONS

Aug. 19, 2014 Search Report issued in International Patent Application No. PCT/JP2014/069286.

*Primary Examiner* — Thomas W Irvin
(74) *Attorney, Agent, or Firm* — Oliff PLC

(57) ABSTRACT

A shock absorbing device that has high strength rigidity and good attenuation characteristics, that can be reduced in weight and size, is free from degassing, and has stable temperature characteristics. The device connects between a first and second member so as to be applicable to shock absorption therebetween, and includes: a first and a second shock absorbing member; and a holding and connecting mechanism which holds the first member via the first and second shock absorbing members and which is connected to the second member. The first shock absorbing member, the first member, and the second shock absorbing member are disposed in that order. The holding and connecting mechanism sandwiches the first shock absorbing member, the first member, and the second shock absorbing member from outside the first and second shock absorbing members, thereby holding the first member while applying stress to the first and second shock absorbing members.

7 Claims, 13 Drawing Sheets

(58) Field of Classification Search
USPC .............. 267/140.13; 248/565, 581, 582
See application file for complete search history.

(56) References Cited

U.S. PATENT DOCUMENTS

| | | | | |
|---|---|---|---|---|
| 5,641,153 A * | 6/1997 | Gwinn | ............... | B60G 13/02 267/140.13 |
| 5,743,509 A * | 4/1998 | Kanda | ............... | F16F 1/38 248/634 |
| 5,799,930 A * | 9/1998 | Willett | ............... | B62D 24/02 267/141.4 |
| 5,842,677 A * | 12/1998 | Sweeney | ............... | F16F 1/3835 248/56 |
| 6,502,883 B2 * | 1/2003 | Rice | ............... | B60G 99/004 267/220 |
| 6,523,817 B1 * | 2/2003 | Landry, Jr. | ............... | F16F 1/3732 267/141.2 |
| 6,820,908 B1 * | 11/2004 | Tousi | ............... | F16F 15/08 248/609 |
| 7,072,001 B2 * | 7/2006 | Chang | ............... | H04N 9/3141 248/580 |
| 7,163,200 B2 * | 1/2007 | Dickson | ............... | F16F 1/3735 248/635 |
| 7,261,365 B2 * | 8/2007 | Dickson | ............... | B60G 99/002 248/635 |
| 7,306,208 B2 * | 12/2007 | Hwang | ............... | B60G 21/055 267/140.12 |
| 7,416,174 B2 * | 8/2008 | Dickson | ............... | F16F 15/08 267/141.1 |
| 7,503,552 B2 * | 3/2009 | Huprikar | ............... | F16F 1/37 267/140.13 |
| 7,612,995 B2 * | 11/2009 | Cheng | ............... | E05L 365/006 361/679.34 |
| 7,682,117 B2 * | 3/2010 | Holt | ............... | F02M 55/025 403/408.1 |
| 8,226,066 B2 * | 7/2012 | Kubat | ............... | F16F 3/093 248/634 |
| 8,646,760 B2 * | 2/2014 | Ishman | ............... | F16F 13/007 248/636 |
| 8,792,242 B2 * | 7/2014 | Wetzel | ............... | H05K 5/0082 361/707 |
| 8,857,800 B2 * | 10/2014 | Kawachi | ............... | B60K 15/067 267/141.3 |
| 8,950,738 B2 * | 2/2015 | Nakamura | ............... | F16F 1/3735 267/140.13 |
| 9,016,971 B2 * | 4/2015 | Masi | ............... | F16F 1/3842 267/140.12 |
| 9,592,922 B2 * | 3/2017 | Aridon | ............... | B64G 1/641 |
| 2001/0040325 A1 * | 11/2001 | Wolf | ............... | F16F 1/3732 267/141 |
| 2006/0202400 A1 * | 9/2006 | Fitzgerald | ............... | F16F 1/3732 267/293 |
| 2011/0303818 A1 * | 12/2011 | Bach | ............... | A47O 3/22 248/571 |
| 2016/0053841 A1 * | 2/2016 | Figura | ............... | F16F 1/38 267/141.5 |
| 2018/0142752 A1 * | 5/2018 | Senneff | ............... | F16F 1/38 |

FOREIGN PATENT DOCUMENTS

| | | |
|---|---|---|
| JP | 2004-334959 A | 11/2004 |
| JP | 2010-505078 A | 2/2010 |
| JP | 2011-96796 A | 5/2011 |
| JP | 2012-197864 A | 10/2012 |

* cited by examiner

100

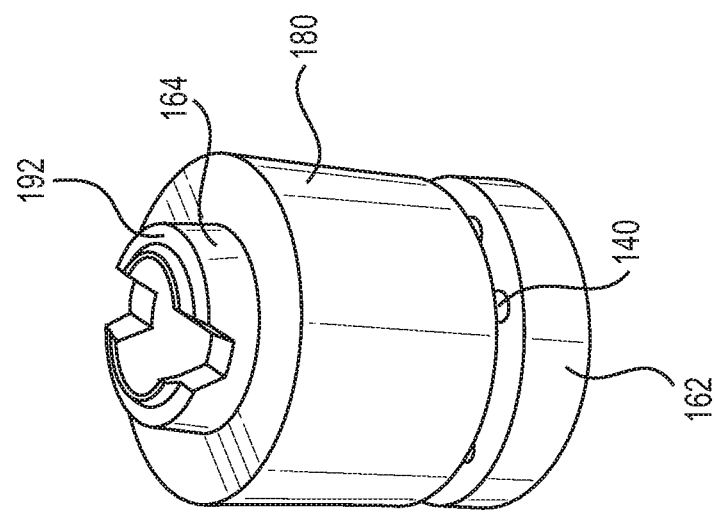
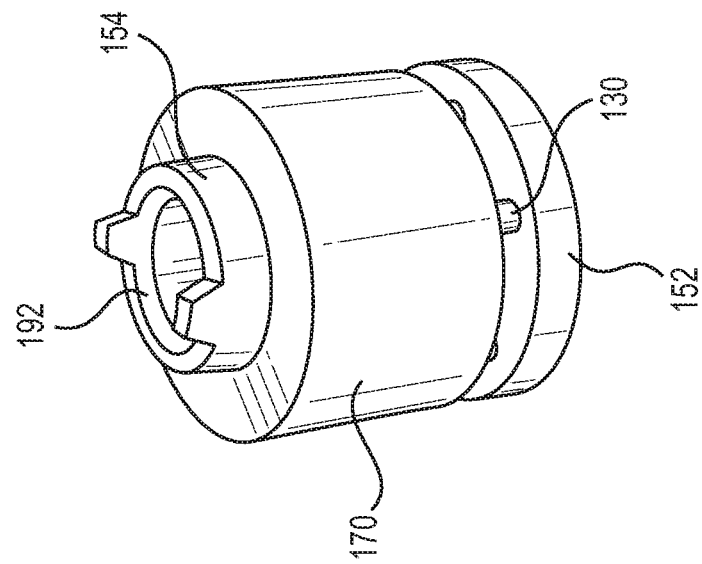
FIG. 4

200

SHOCK ABSORBING DEVICE

This is a Continuation of International Application No. PCT/JP2014/069286 filed Jul. 22, 2014. The disclosure of the prior application is hereby incorporated by reference herein in its entirety.

BACKGROUND OF THE INVENTION

1. Field of the Invention

The present invention relates to a shock absorbing device. Particularly, the present invention relates to a shock absorbing device having high strength and rigidity and excellent attenuation characteristic, a shock absorbing device enabling miniaturization and weight reduction to be realized, a shock absorbing device free from worry about degassing, and a shock absorbing device having stable damping and stiffness characteristics in wide temperature range.

2. Description of the Related Art

JP-A-2012-197864 (Patent Document 1) discloses a hysteretic damper having shape self-restoration capability added thereto by tensile force of a super elastic alloy. The hysteretic damper comprises a first super elastic alloy member to which a tensile force acts under tension and a second super elastic alloy member to which a tensile force acts under compression, has a structure for carrying out self-restoration of a damper shape by the first super elastic alloy member and the second super elastic alloy member, and characteristics under tension and compression can be set freely.

SUMMARY OF THE INVENTION

As a basic characteristic required for a shock absorbing device, there should be noted attenuation of vibration while maintaining high strength and rigidity, stable temperature characteristic and so on. Additionally, a shock absorbing device used for an aerospace field is required to be small in size and weight, and to decrease degassing procedures and so on. For example, however, a shock absorbing device which is suitable for an aerospace field, small in size and weight, and has high strength and rigidity and excellent attenuation characteristic has not yet been necessarily provided. Additionally, for use in the aerospace field, it is necessary to consider degassing from the shock absorbing device, and also consideration should be made for stability of the temperature characteristic.

An object of the present invention is to provide a shock absorbing device having high strength and rigidity and excellent attenuation characteristic. Furthermore, another object of the present invention is to provide a shock absorbing device enabling miniaturization and weight reduction to be realized. A further object of the present invention is to provide a shock absorbing device free from worry about degassing, and also, a shock absorbing device having stable temperature characteristic.

SUMMARY OF THE INVENTION

In order to solve the above problems, according to the present invention, there is provided a shock absorbing device for connecting a first member and a second member, and applicable for shock between said first member and said second member, comprising: first cushioning members and second cushioning members, and a holding connecting mechanism for holding said first member through said first cushioning members and said second cushioning members, and being connected to said second member, wherein said first cushioning members, said second cushioning members and said first member are arranged in order of said first cushioning members, said first member and said second cushioning members, said holding connecting mechanism holds said first member by clamping said first cushioning members, said first member and said second cushioning members from outside of said first cushioning members and said second cushioning members while adding stress to said first cushioning members and said second cushioning members, and said first member and said second member are connected thereby.

When said first member is a plate material comprising a first surface and a second surface which is an opposite surface of said first surface, and said plate material has a penetration hole reaching said second surface from said first surface, a shock absorbing device may have following features: said holding connecting mechanism comprises a first coupler located on a side of said first surface and a second coupler located on a side of said second surface, said first coupler comprises a first holding portion for holding said first cushioning members between said plate material and said first holding portion, and a first connecting portion being connected to said second coupler through said penetration hole, said second coupler comprises a second holding portion for holding said second cushioning members between said plate material and said second holding portion, and a second connecting portion being connected to said first coupler through said penetration hole, said first cushioning members are subject to said stress between a first holding portion and said plate material, and second cushioning members are subject to said stress between a second holding portion and said plate material by connecting said first connecting portion and said second connecting portion. In this case, said first cushioning members and said second cushioning members may comprise a plurality of columnar cushioning members, and said plurality of columnar cushioning members may be arranged around said first connecting portion and said second connecting portion. Furthermore, said first cushioning members and said second cushioning members may comprise cylindrical cushioning members having a penetration hole between a top surface and a bottom surface, and said first connecting portion and said second connecting portion may be connected through said penetration hole of said cylindrical cushioning members.

When said first member is a plate material having a first surface and a second surface which is an opposite surface of said first surface, said plate material comprises a penetration hole reaching said second surface from said first surface, a shock absorbing device may have following features: said holding connecting mechanism comprises a first holding portion arranged on a side of said first surface, a second holding portion arranged on a side of said second surface, and a connecting portion for connecting said first holding portion and said second holding portion through said penetration hole, said first cushioning members and said second cushioning members comprises a plurality of plate cushioning members, said plurality of plate cushioning members are deflected each other, one end is fixed on said first member, and another end is fixed on said first holding portion or said second holding portion, and stress will be applied to said plate cushioning members thereby.

Said first cushioning members and said second cushioning members may be made of singlecrystal shape memory alloy, and said singlecrystal shape memory alloy is in austenite condition in working environment temperature, and becomes martensite condition by adding stress. In this case, said holding connecting mechanism may be adjusted so that the stress to be applied to said first cushioning members and said second cushioning members in a condition which said first member is held between said first cushioning members and said second cushioning members is neutrality of stress range having the condition that said singlecrystal shape memory alloy is in martensite condition.

In the above-mentioned summary of the invention, description is not made for all of necessary features of the present invention. Furthermore, sub-combination of these feature groups can be potential inventions.

BRIEF DESCRIPTION OF THE DRAWINGS

FIG. 1A is an exploded perspective view, and FIG. 1B is an assembly perspective view.

FIG. 4 shows a partially assembled state of a shock absorbing device 100.

FIG. 12A is an exploded perspective view, and FIG. 12B is an assembly perspective view.

DETAILED DESCRIPTION OF THE PREFERRED EMBODIMENTS

Now, hereinafter description of the present invention will be made with reference to embodiments of the present invention, however, following embodiments of the invention never limit a scope of claims. Furthermore, all of features explained in the embodiments of the invention are not necessarily required as means to solve the problems of the present invention.

EXAMPLE 1

Figure 1A:
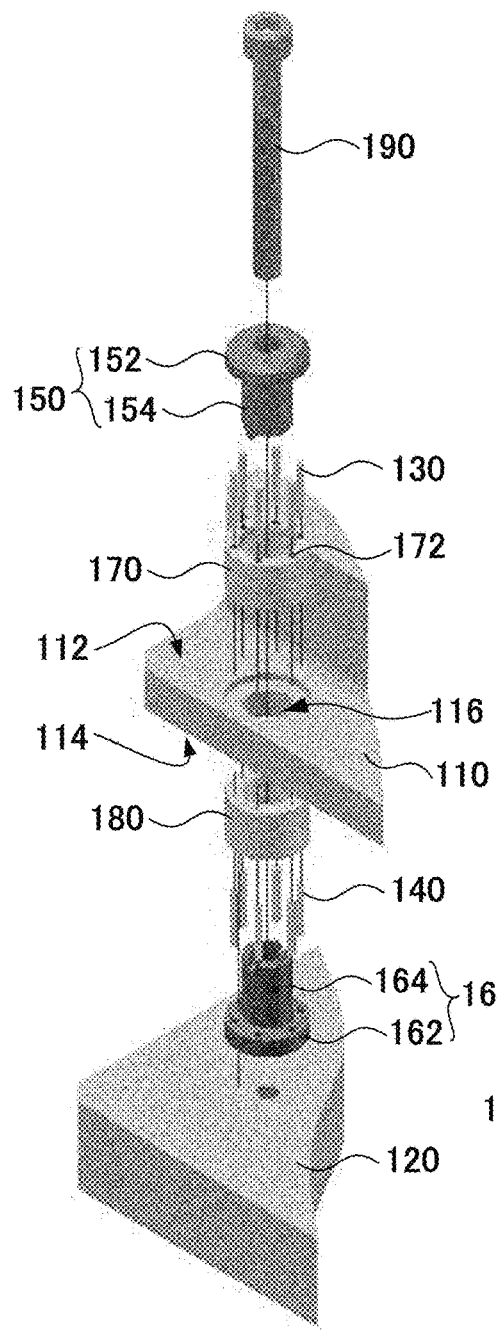
FIGS. 1A and 1B shows a shock absorbing device 100.
Figure 1B:
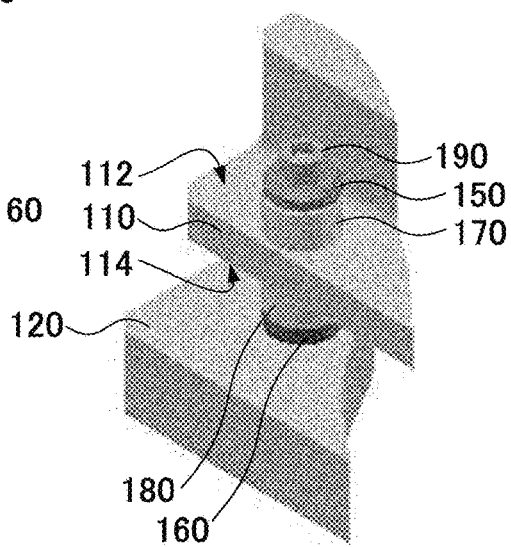
Figure 2:
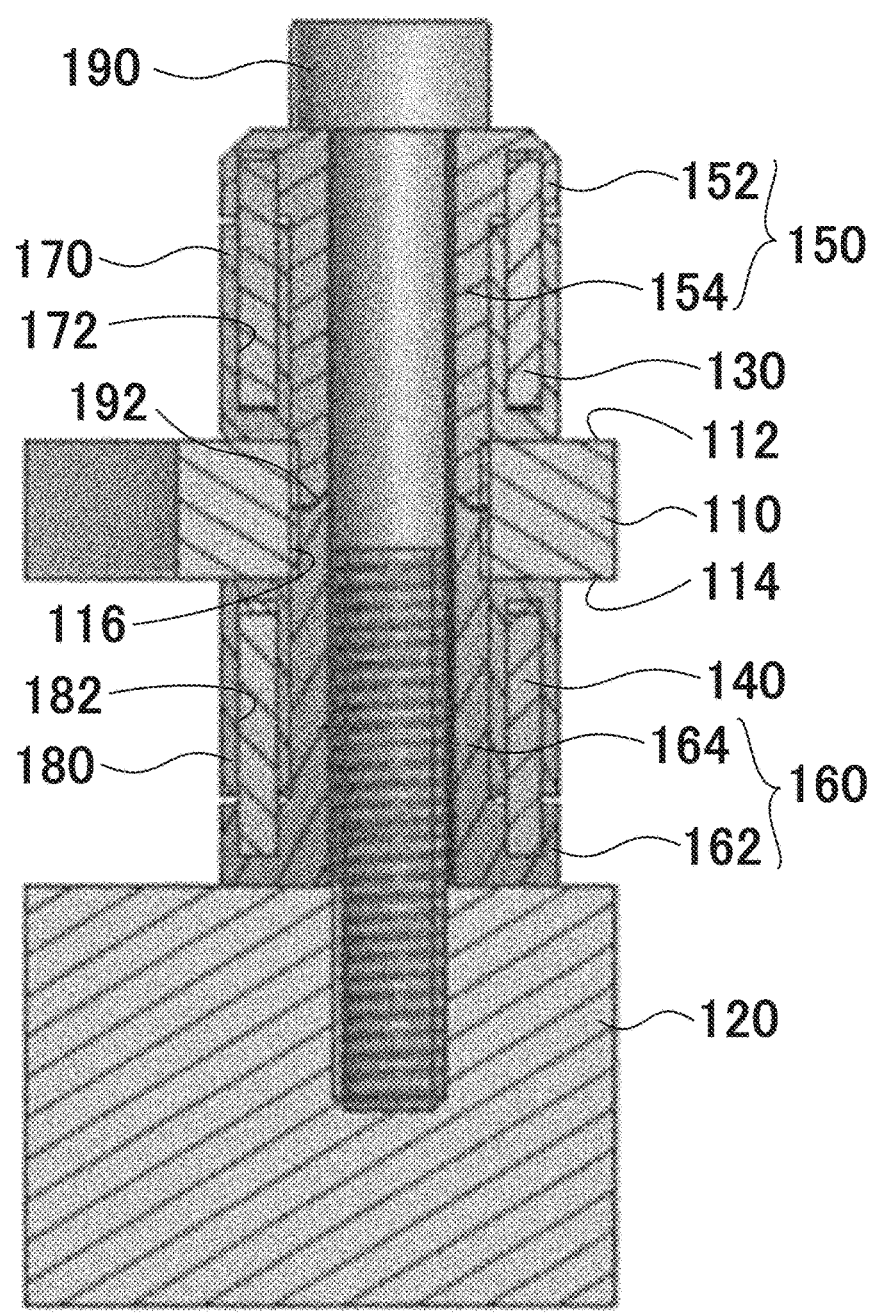
FIG. 2 shows a cross-sectional view of a shock absorbing device 100.
Figure 3:
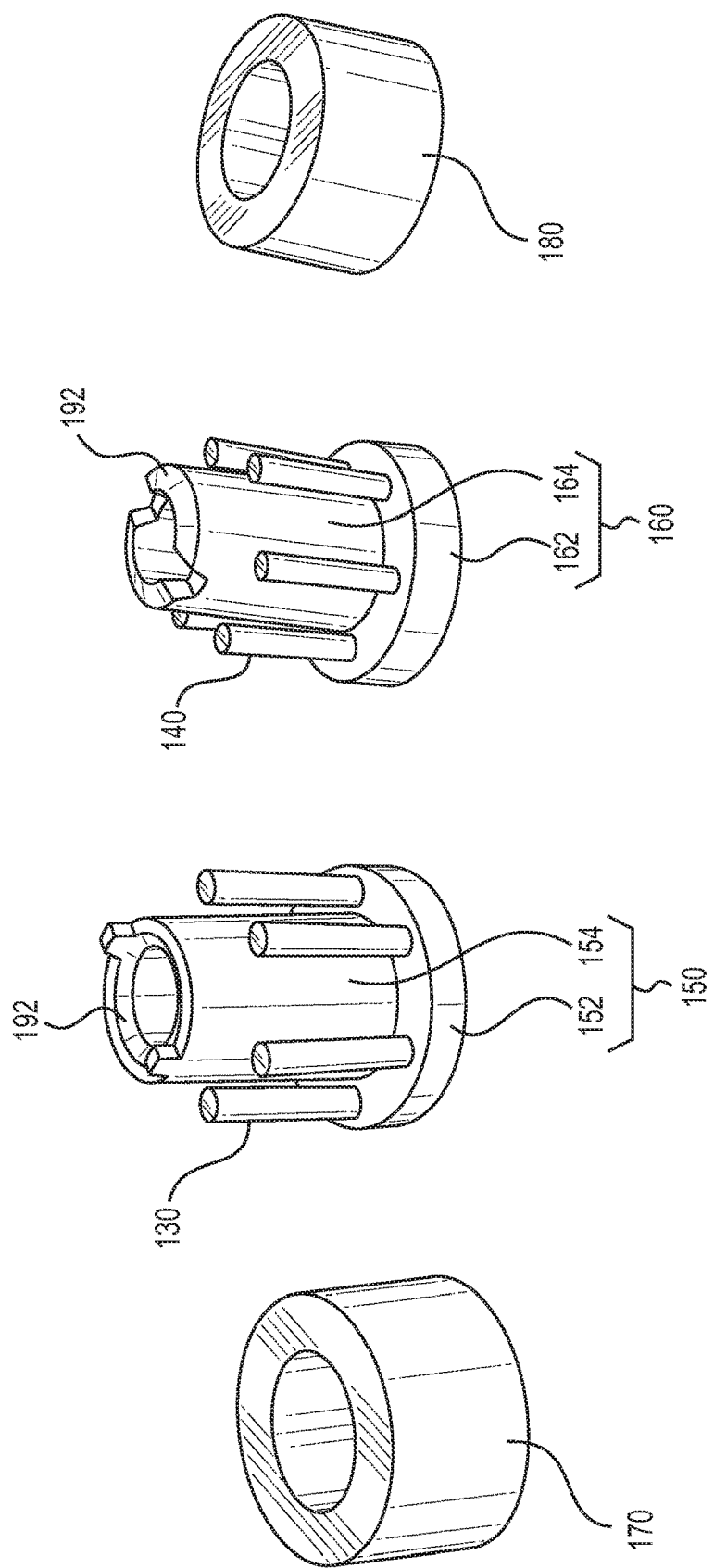
FIG. 3 shows a partially assembled, state of a shock absorbing device 100.
Figure 5:
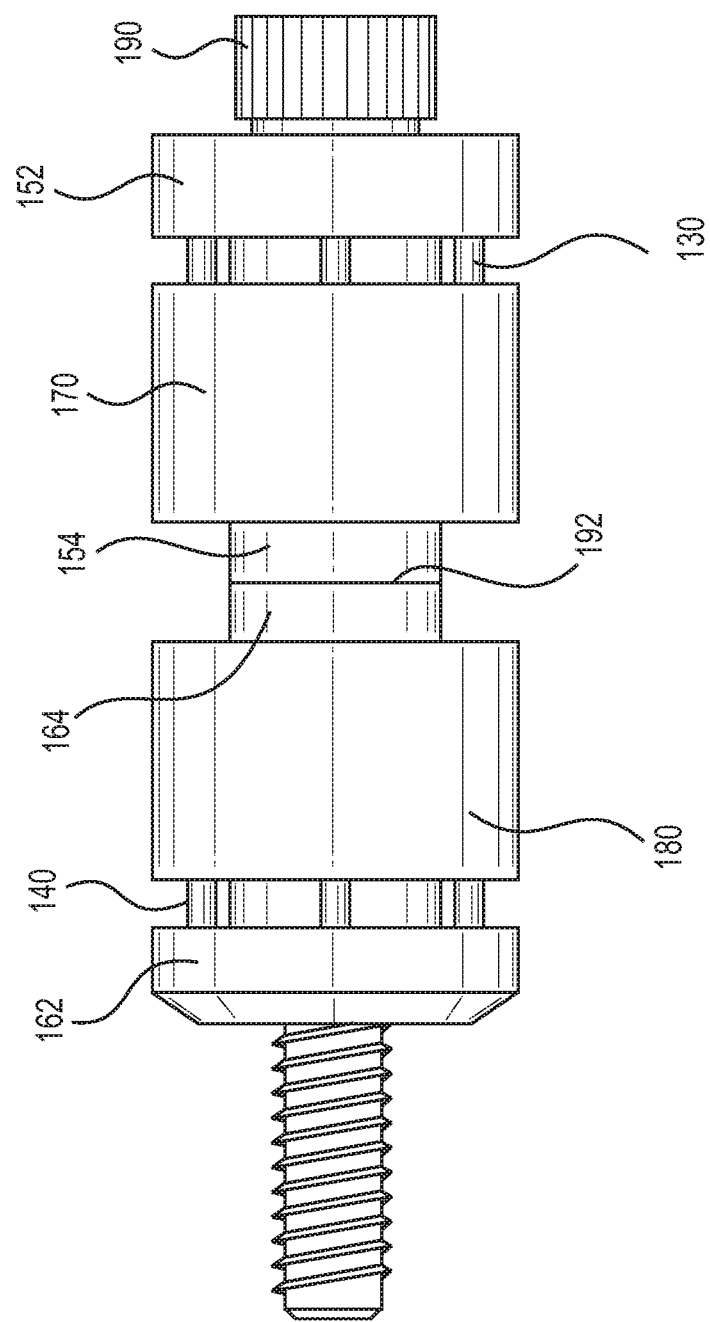
FIG. 5 shows an assembled state of a shock absorbing device 100.
Figure 6:
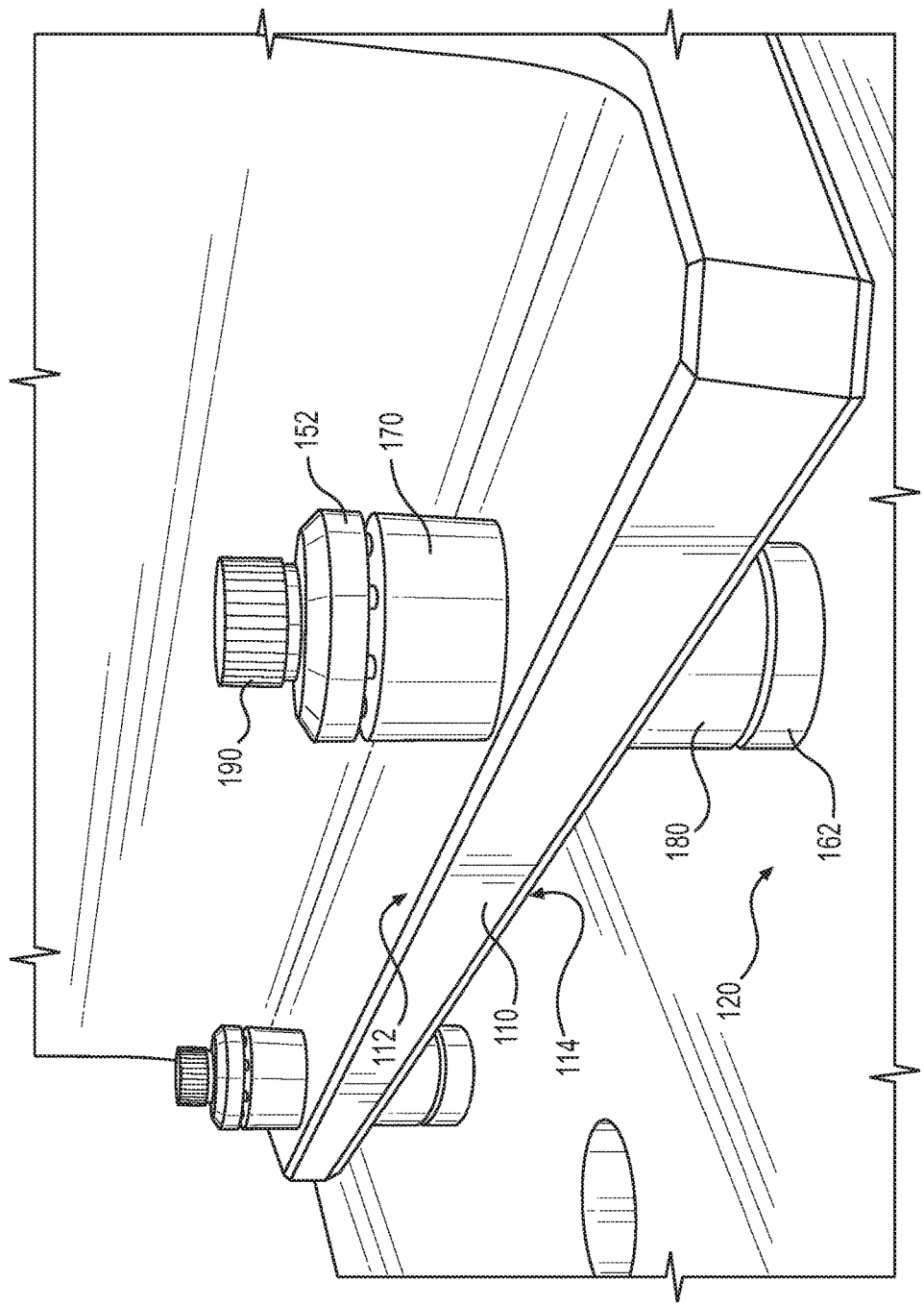
FIG. 6 is a photo showing a state chat a shock absorbing device 100 is arranged between a first member 110 and a second member 120.

FIGS. 1A and 1B shows a shock absorbing device 100. FIG. 1A is an exploded perspective view, and FIG. 1B is an assembly perspective view. FIG. 2 shows a cross-sectional view of a shock absorbing device 100. FIGS. 3 and 4 are photos showing a partially assembled state of a shock absorbing device 100, respectively, and FIG. 5 is a photo showing an assembled state of a shock absorbing device 100. FIG. 6 is a photo showing a state that a shock absorbing device 100 is arranged between a first member 110 and a second member 120.

A shock absorbing device 100 connects a first member 110 and a second member 120, and suitable for cushioning the first member 110 and the second member 110. A second member 120 may be satellites, for example, such as a body (housing) of an apparatus which is difficult to avoid vibration or shock to be added to the body. A first member 110 is fixed on a body (housing) such as a precision apparatus and so on, and also a supporting member for a built-in apparatus which should prevent propagation of vibration from the body. The vibration or shock to be added to the second member 120 can be suppressed by arranging a shock absorbing device 100 between the second member 120 and the first member 110.

A shock absorbing device 100 comprises first cushioning members 130, second cushioning members 140, and a holding connecting mechanism. The first cushioning members 130, the second cushioning members 140 and the first member 110 are arranged in order of a first cushioning members 130, a first member 110 and a second cushioning members 140, and a holding connecting mechanism holds a first member 110 by clamping the first cushioning members 130 and the second cushioning members 140 from the outside. The holding connecting mechanism holds the first member 110 through the first cushioning members 130 and the second cushioning members 140.

The holding connecting mechanism is connected to the second member 120. Accordingly, the first member 110 held by the holding connecting mechanism is also supported by the second member 120 through the holding connecting mechanism, and vibration and shock added to the second member 120 are absorbed by the first cushioning members 130 and the second cushioning members 140 and the propagation of the vibration and so on to the first member 110 can be suppressed.

Description will be made in detail about a structure of the shock absorbing device 100 shown in FIGS. 1A, 1B and 2. The first member 110 is a plate material comprising a first surface 112 and a second surface 114 which is an opposite surface of the first surface 112. The first member 110 of the plate material comprises a penetration hole 116 reaching the second surface 114 from the first surface 112.

The holding connecting mechanism comprises a first coupler 150 located on a side of the first surface 112 and a second coupler 160 located on a side of the second surface 114. The first coupler 150 comprises a first holding portion 152 and a first connecting portion 154, and a second coupler 160 comprises a second holding portion 162 and a second connecting portion 164.

The first holding portion 152 holds the first cushioning members 130 between the first member 110 of the plate material and the first holding portion 152, and the first connecting portion 154 is connected to the second coupler 160 through the penetration hole 116. The second holding portion 162 holds the second cushioning members 140 between the first member 110 of the plate material and the second holding portion 162, and the second connecting portion 164 is connected to the first coupler 150 through the penetration hole 116.

The first cushioning members 130 comprise a plurality of columnar cushioning members, which are movably held the inside of a hole 172 formed in a first collar 170. Since the plurality of columnar cushioning members are held in the hole 172 of the first collar 170, the first cushioning members 130 are arranged around the first connecting portion 154. One end of the columnar first cushioning member 130 is abutted on a bottom surface of the hole 172, and another end is abutted on the first holding portion 152 of the first coupler 150. By tightening a bolt 190, the first coupler 150 is pressed in a direction of the first member 110 to be held, and the first cushioning members 130 are subject to stress.

The second cushioning members 140 comprise a plurality of columnar cushioning members, which are movably held inside of a hole 182 formed in a second collar 180. Since the plurality of columnar cushioning members are held in the hole 182 of the second collar 180, the second cushioning members 140 are arranged around the second connecting portion 164. One end of the columnar second cushioning member 140 is abutted on a bottom surface of the hole 182, and another end is abutted on the second holding portion 162 of the second coupler 160. By tightening the bolt 190, the second coupler 160 is pressed in a direction of the first member 110 to be held, and the second cushioning members 140 are subject to stress.

As described above, by tightening the bolt 190, and connecting the first connecting portion 154 of the first coupler 150 and the second connecting portion 164 of the second coupler 160, the first cushioning members 140 are subject to stress between the first holding portion 152 and the plate material, and the second cushioning members 140 are subject to stress between the second holding portion 162 and the plate material. However, when the first connecting portion 154 and the second connecting portion 164 are engaged on an engaging surfaced 192, further clamping force is not applied to the first cushioning members 130 and the second cushioning members 140, and the stress applied to a first cushioning members 130 and the second cushioning members 140 is restricted. Namely, under a state that the shock absorbing device 100 is assembled and arranged between the first member 110 and the second member 120, if it is in a state of neutrality without adding vibration and so on, a certain stress is applied to the first cushioning members 130 and the second cushioning members 140.

As the first cushioning members 130 and the second cushioning members 140, a singlecrystal shape memory alloy should be noted. Specifically, the singlecrystal shape memory alloy of copper/aluminum/nickel series is preferable. Furthermore, the singlecrystal shape memory alloy becomes austenite condition in a working environment temperature, and it is preferable to be martensite condition by applying the stress.

Figure 7:
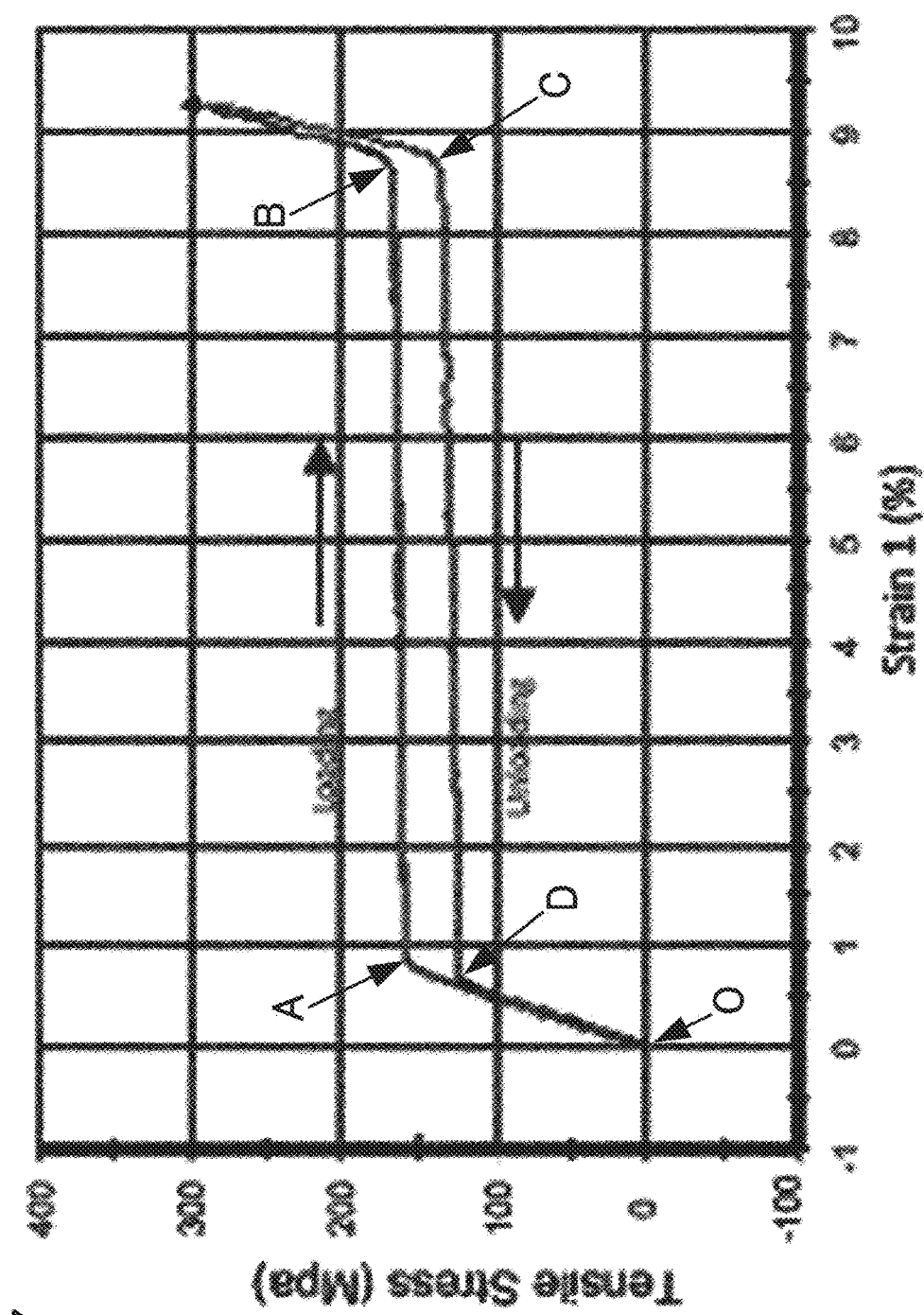
FIG. 7 is a graph showing a stress-strain characteristic of a singlecrystal shape memory alloy of copper/aluminum/nickel series.

FIG. 7 is a graph showing a stress-strain characteristic of the singlecrystal shape memory alloy of copper/aluminum/nickel series. The stress-strain characteristic in FIG. 7 shows hysteresis that the stress increases between 0 to 300 MPa, and decreases to 0 MPa thereafter. The singlecrystal shape memory alloy of copper/aluminum/nickel series are in austenite condition which increases in strain in proportion to the stress from O point to A point, and become martensite condition which large distortion will be made by a small increase of stress from A point to B point. Beyond a maximum distortion (B point) in the martensite condition, after applying the stress and decreasing the same, the martensite condition can be obtained between C point to D point. Beyond D point, it becomes austenite condition.

A shock absorbing device 100 according to embodiments of the present invention uses a shape memory alloy which becomes the martensite condition by applying the stress as the first cushioning members 130 and the second cushioning members 140. Namely, under a state that the shock absorbing device 100 is arranged between the first member 110 and the second member 120, and neutrality state without adding vibration and so on is kept, a certain stress is applied in advance to the first cushioning members 130 and the second cushioning members 140 so as to be martensite condition.

It is preferable that the stress to be applied in advance, namely the stress to be applied to the first cushioning members 130 and the second cushioning members 140 in a state that the first member 110 is held between the first cushioning members 130 and the second cushioning members 140, is neutrality of the stress range in the condition that the singlecrystal shape memory alloy is in the martensite condition. It is preferable that the stress to be applied in advance has an intermediate value of each stress at A point and D point in FIG. 7, or an intermediate value of each stress at B point and C point.

The value of the stress to be applied in advance can be determined by adjusting the holding connecting mechanism. For example, in the shock absorbing device 100, neutrality of the stress range in the martensite condition can be obtained in a manner that lengths of the first connecting portion 154 of the first coupler 150 and the second connecting portion 164 of the second coupler 160, and lengths of the first cushioning members 130 and the second cushioning members 140 are adjusted so that distortion of the first cushioning members 130 and the second cushioning members 140 becomes 4.5%.

In the shock, absorbing device 100, the shape memory alloy is used for the first cushioning members 130 and the second cushioning members 140, and the shape memory alloy is in martensite condition by applying the stress in advance. Therefore, damping force can be obtained from a hysteresis loop in the martensite condition, and excellent attenuation characteristic can be obtained while maintaining high strength and rigidity. When the a singlecrystal shape memory alloy, especially the singlecrystal shape memory alloy of copper/aluminum/nickel series is used as the first cushioning members 130 and the second cushioning members 140, strain range becomes relatively large 9% in the martensite condition, and the stress range of the hysteresis becomes narrow. Therefore, even if stress change is small, amount of distortion change becomes large and effective attenuation can be realized. As a result, it becomes easy to realize a device small in size and weight. Since the singlecrystal shape memory alloy of copper/aluminum/nickel series has wide transition temperature range of −270° C. to +250° C., stability of the temperature characteristic of the shock absorbing device 100 can be realized. Furthermore, the shock absorbing device 100 consist of metals, and there can be obtained the device free from worry about degassing.

Figure 8:
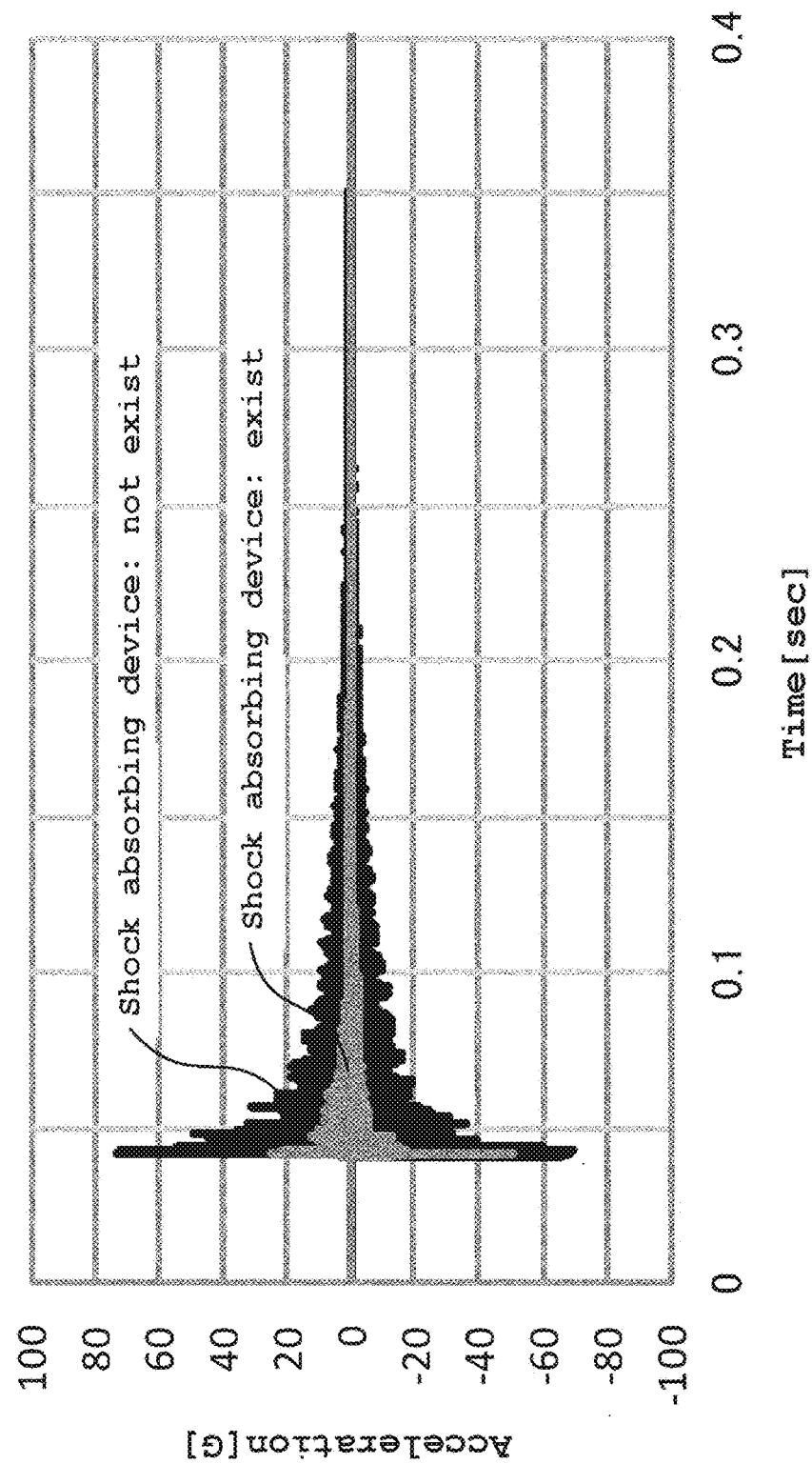
FIG. 8 is a graph showing a result of a shock test, in which a time response of acceleration is shown in a case that a shock absorbing device 100 exists or not, respectively.
Figure 9:
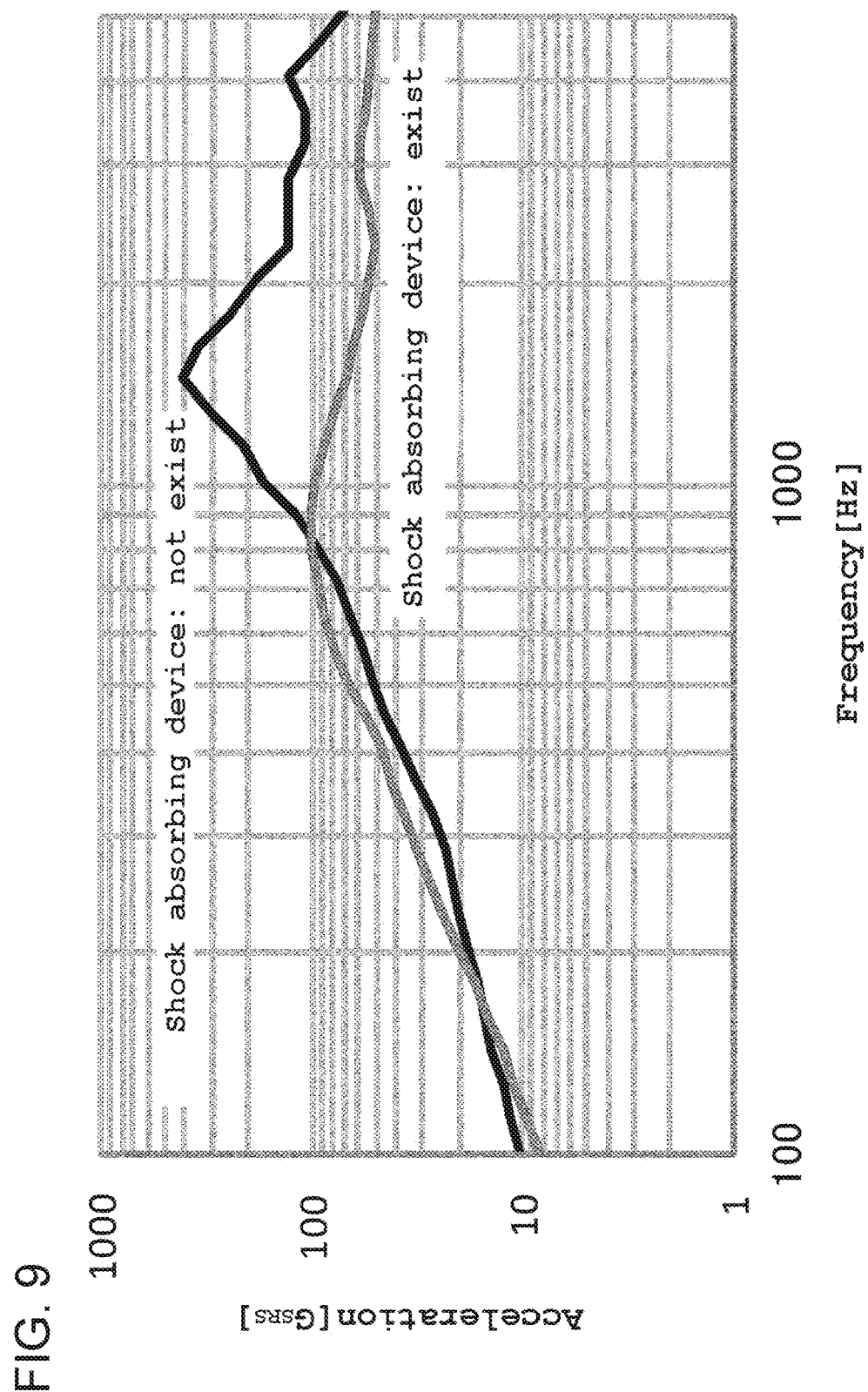
FIG. 9 is a graph showing a result of a shock test, in which frequency response of acceleration is shown in a case that a shock absorbing device 100 exists or not, respectively.
Figure 10:
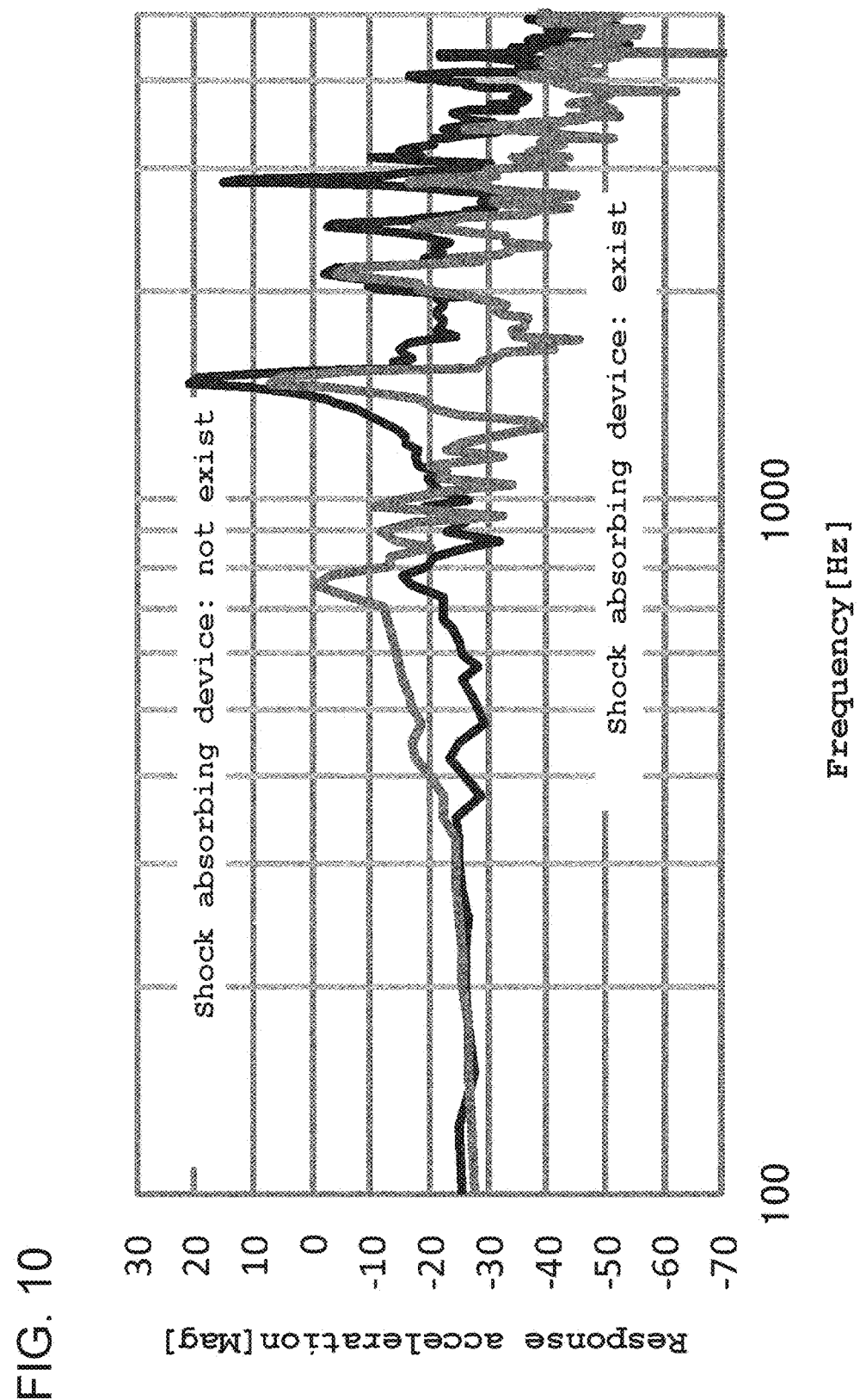
FIG. 10 is a graph showing a result of an shock test, in which frequency response of response acceleration is shown in a case that a shock absorbing device 100 exists or not, respectively.

FIGS. 8 to 10 are graphs showing a result of a shock test, in which a test is carried out about vibration state of the first member 110 when the shock is added to the second member 120. FIG. 8 shows a time response of acceleration of the first member 110, FIG. 9 shows frequency response of acceleration of the first member 110, and FIG. 10 shows frequency response of response acceleration of the first member 110 in a case the shock absorbing device 100 exists or not, respectively. When the shock absorbing device 100 exists, an absolute value of the acceleration is small in comparison with the case the shock absorbing device 100 does not exist, and it is apparent that the acceleration and response acceleration are reduced in high frequency range more than 1 kHz.

Figure 11:
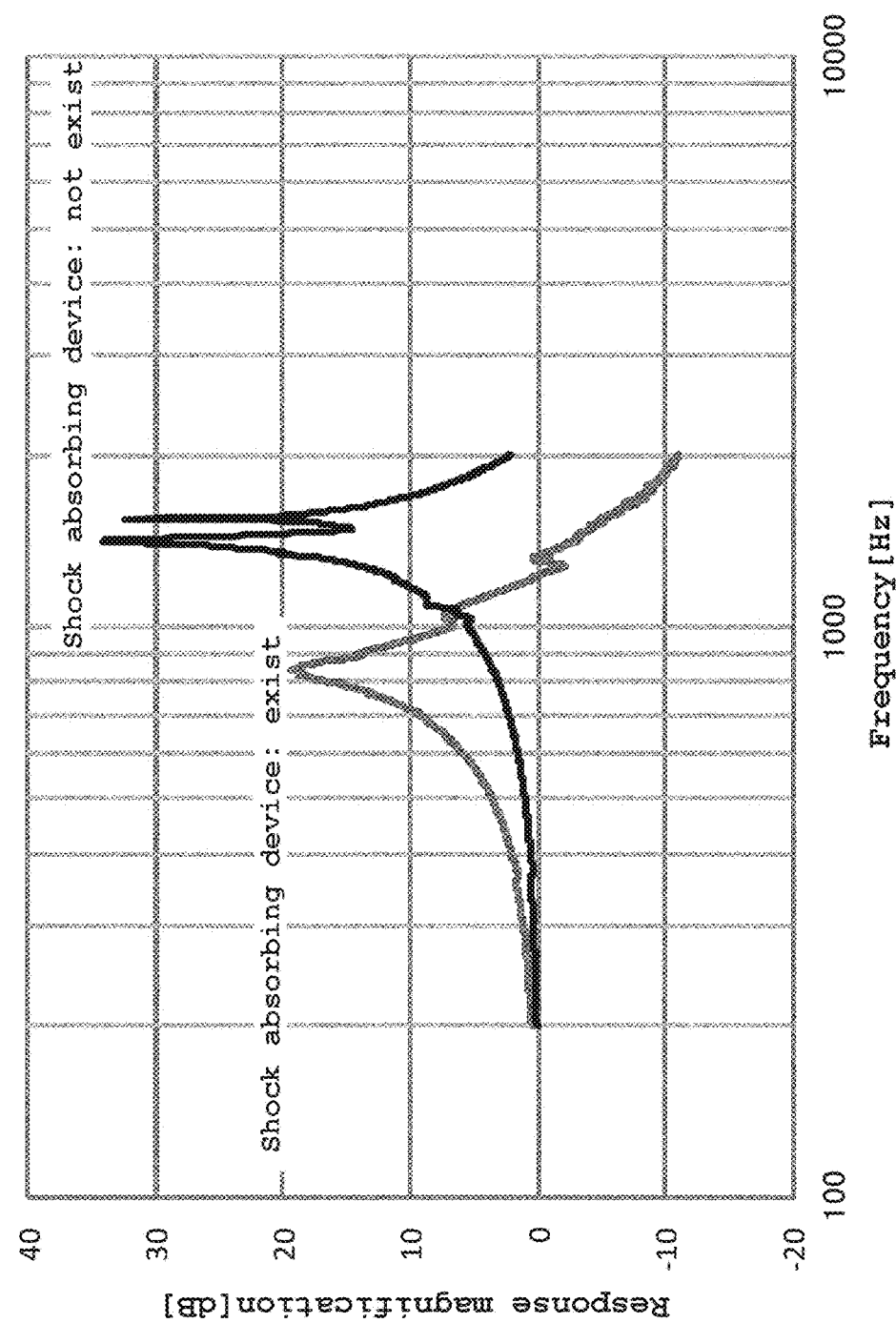
FIG. 11 is a graph showing a result of a random vibration test, in which frequency response of a response magnification is shown in a case that a shock absorbing device 100 exists or not, respectively.

FIG. 11 is a graph showing a result of a random vibration test, and frequency response of response magnification in a case the shock absorbing device 100 exists or not, respectively. When the shock absorbing device 100 exists, a maximum value of the response magnification is largely reduced in comparison with the case the shock absorbing device 100 does not exist, and it is apparent that a peak value is shifted to a low frequency side.

As apparent from the results of FIGS. 8 to 11, the test found that the vibration and shock are reduced by the shock absorbing device 100, in particular, vibration in a high frequency range more than 1 kHz can be reduced.

The present invention is described above with reference to embodiments of the present invention, and a technical scope of the invention is never limited by the above description. It is obvious to those skilled in the art to add various modification and improvement to the above embodiments of the present invention. It is apparent from description of claims that such embodiments to which these modification and improvement are added are also included in the technical scope of the present invention.

Figure 12A:
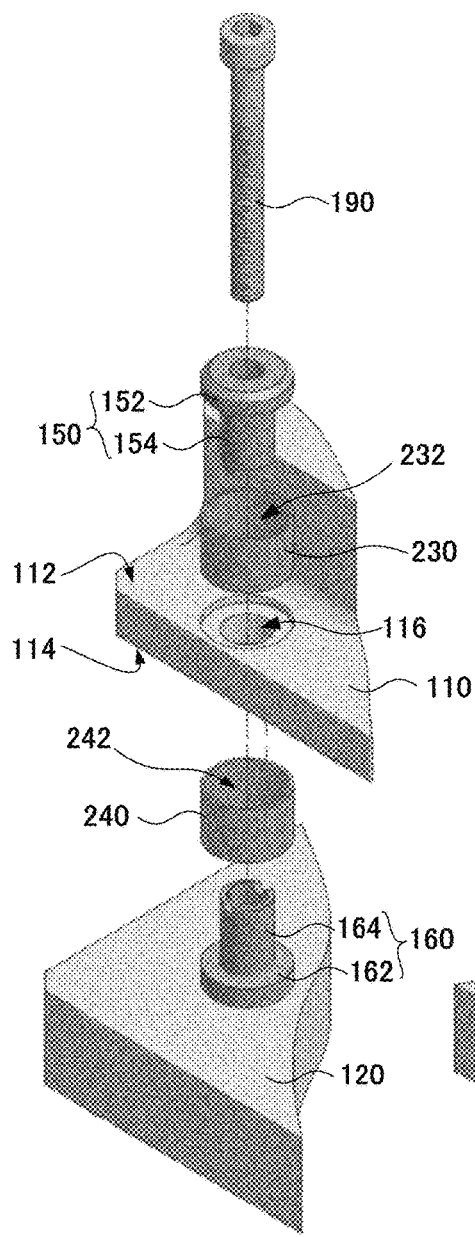
FIGS. 12A and 12B is a shock absorbing device 200.
Figure 12B:
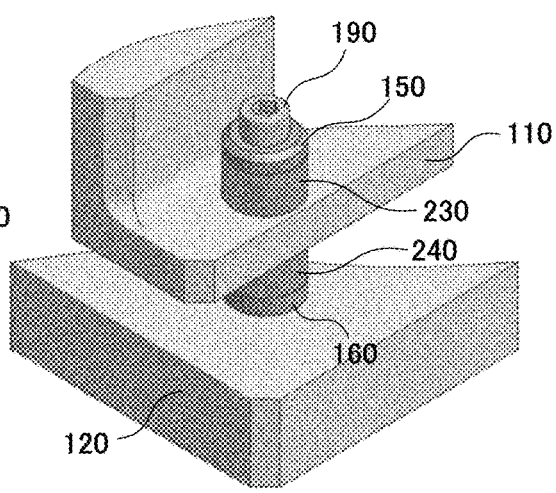

For example, as a shock absorbing device 200 in FIGS. 12A and 12B, third cushioning members 230 and fourth cushioning members 240 can be included. FIG. 12A is an exploded perspective view, and FIG. 12B is an assembly perspective view. The shock absorbing device 200 is made by eliminating the first collar 170 and the second collar 180 of the shock absorbing device 100, and replacing the first cushioning members 130 and the second cushioning members 140 with the third cushioning members 230 and the fourth cushioning members 240. The third cushioning members 230 and the fourth cushioning members 240 are cylindrical cushioning members and comprise penetration holes 232 and 242 between a top surface to a bottom surface, respectively. The first connecting portion 154 and the second connecting portion 164 are connected through the penetration holes 232 and 242 of the cylindrical cushioning members. The shock absorbing device 200 has a similar effect as that of the shock absorbing device 100.

Figure 13:
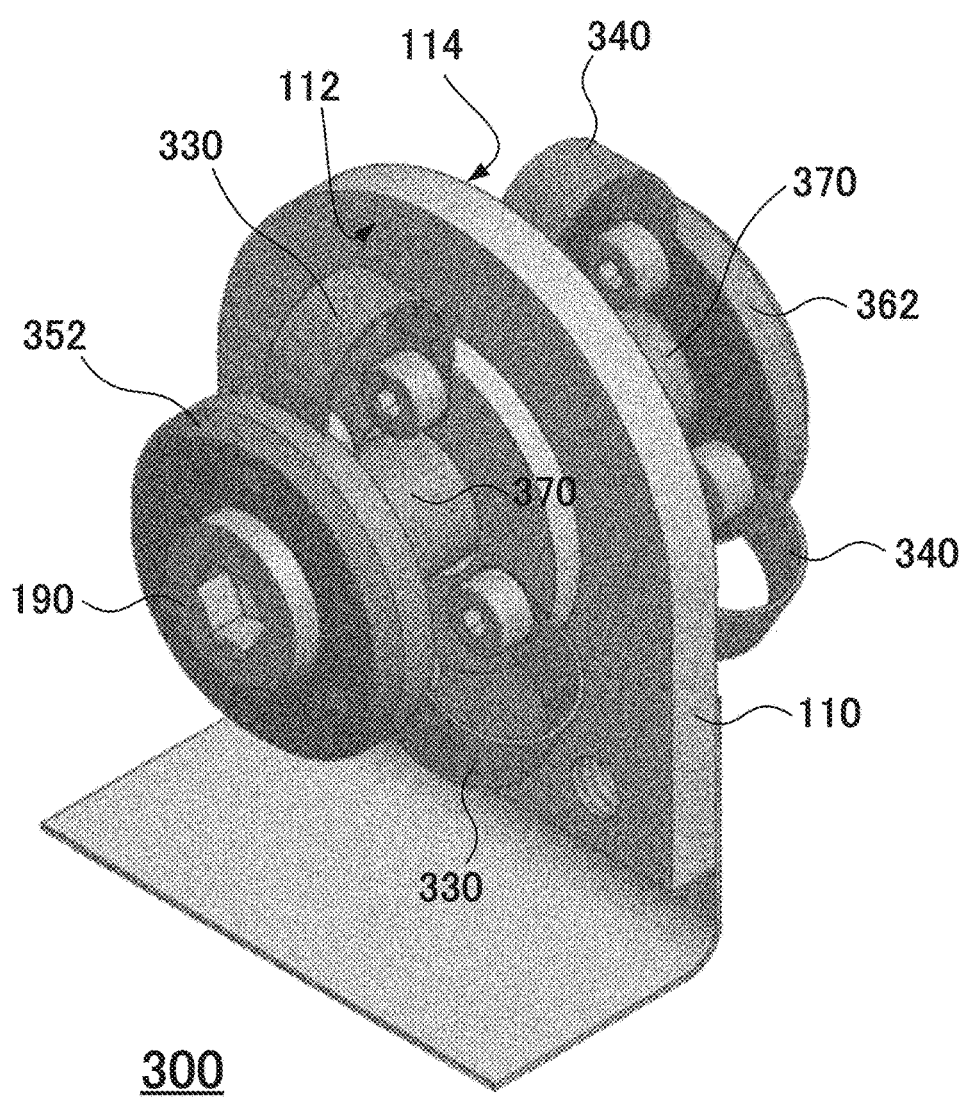
FIG. 13 is a perspective view of a shock absorbing device 300.

As a shock absorbing device 300 of FIG. 13, fifth cushioning members 330 and sixth cushioning members 240 can be included. FIG. 13 shows a perspective view of the shock absorbing device 300. In the shock absorbing device 300, as same as structure of the shock absorbing device 100, the first member 110 is the plate material comprising the first surface 112 and the second surface 114 which is an opposite surface of the first surface 112, and the first member 110 of the plate material comprises the penetration hole 116 reaching the second surface 114 from the first surface 112. In the shock absorbing device 300, the holding connecting mechanism comprises a third holding portion 352 arranged on a side of the first surface 112, a fourth holding portion 352 arranged on a side of the second surface 114, and a connecting portion 370 for connecting the third holding portion 352 and the fourth holding portion 362 through the penetration hole 116. The fifth cushioning members 330 and the sixth cushioning members 340 comprise a plurality of plate cushioning members, which are deflected each other, one end is fixed on the first member 110, and another end is fixed on the third holding portion 352 or the fourth holding portion 362. The stress will be applied to the plate cushioning members thereby.

The fifth cushioning members 330 and the sixth cushioning members 340 of the shock absorbing device 300 have a plate shape, which is transitional to the martensite condition by bending stress. This is a different point from that the first cushioning members 130 and the second cushioning members 140 of the shock absorbing device 100, or the third cushioning members 230 and the fourth cushioning members 240 of the shock absorbing device 200 are transitional to the martensite condition by compressed force. Since the fifth cushioning members 330 and the sixth cushioning members 340 have a plate shape, the shock absorbing device 300 is excellent in absorbing shock at low frequency range in comparison with the shock absorbing device 100 or the shock absorbing device 200. Other than this point, similar effect as that of the shock absorbing device 100 or the shock absorbing device 200 can be obtained.

The invention claimed is:

1. A shock absorbing device for connecting a first member and a second member, and applicable for shock between said first member and said second member, comprising:
   first cushioning members and second cushioning members, and
   a holding connecting mechanism for holding said first member through said first cushioning members and said second cushioning members, and being connected to said second member, wherein
   said first cushioning members, said second cushioning members and said first member are arranged in order of said first cushioning members, said first member and said second cushioning members,
   said holding connecting mechanism holds said first member by clamping said first cushioning members, said first member and said second cushioning members from outside of said first cushioning members and said second cushioning members while adding stress to said first cushioning members and said second cushioning members, said first member and said second member are connected thereby, and
   said first cushioning members and said second cushioning members are made of singlecrystal shape memory alloy.

2. The shock absorbing device as claimed in claim 1, wherein
   said first member is a plate material comprising a first surface and a second surface which is an opposite surface of said first surface,
   said plate material has a penetration hole reaching said second surface from said first surface,
   said holding connecting mechanism comprises a first coupler located on a side of said first surface and a second coupler located on a side of said second surface,
   said first coupler comprises a first holding portion for holding said first cushioning members between said plate material and said first holding portion, and a first connecting portion being connected to said second coupler through said penetration hole,
   said second coupler comprises a second holding portion for holding said second cushioning members between said plate material and said second holding portion, and a second connecting portion being connected to said first coupler through said penetration hole,
   said first cushioning members are subject to said stress between said first holding portion and said plate material, and
   said second cushioning members are subject to said stress between said second holding portion and said plate material by connecting said first connecting portion and said second connecting portion.

3. The shock absorbing device as claimed in claim 2, wherein
  said first cushioning members and said second cushioning members comprise a plurality of columnar cushioning members, and
  said plurality of columnar cushioning members are arranged around said first connecting portion and said second connecting portion.

4. The shock absorbing device as claimed in claim 2, wherein
  said first cushioning members and said second cushioning members comprise cylindrical cushioning members having a penetration hole between a top surface and a bottom surface, and
  said first connecting portion and said second connecting portion are connected through said penetration hole of said cylindrical cushioning members.

5. The shock absorbing device as claimed in claim 1, wherein
  said first member is a plate material having a first surface and a second surface which is an opposite surface of said first surface,
  said plate material comprises a penetration hole reaching said second surface from said first surface,
  said holding connecting mechanism comprises a first holding portion arranged on a side of said first surface, a second holding portion arranged on a side of said second surface, and a connecting portion for connecting said first holding portion and said second holding portion through said penetration hole,
  said first cushioning members and said second cushioning members comprises a plurality of plate cushioning members,
  said plurality of plate cushioning members are deflected each other, one end is fixed on said first member, another end is fixed on said first holding portion or said second holding portion, and stress will be applied to said plate cushioning members thereby.

6. The shock absorbing device as claimed in claim 1, wherein
  said singlecrystal shape memory alloy is in austenite condition in working environment temperature, and becomes martensite condition by adding stress.

7. The shock absorbing device as claimed in claim 6, wherein
  said holding connecting mechanism is adjusted so that the stress to be applied to said first cushioning members and said second cushioning members in a condition which said first member is held between said first cushioning members and said second cushioning members is neutrality of stress range having the condition that said singlecrystal shape memory alloy is martensite.

* * * * *